United States Patent
Hariri et al.

(10) Patent No.: US 10,179,568 B2
(45) Date of Patent: Jan. 15, 2019

(54) SEAMLESS VEHICLE ACCESS SYSTEM

(71) Applicant: Faraday & Future Inc., Gardena, CA (US)

(72) Inventors: Mohamad Mwaffak Hariri, Dearborn Heights, MI (US); Adam Michael Kibit, Torrance, CA (US); Mark Lewis Zeinstra, Holland, MI (US); Matthew R. Partsch, San Pedro, CA (US); Daniel L. Kowalewski, Redondo Beach, CA (US); Cian John Francis Brogan, Los Angeles, CA (US)

(73) Assignee: Faraday & Future Inc., Gardena, CA (US)

( * ) Notice: Subject to any disclaimer, the term of this patent is extended or adjusted under 35 U.S.C. 154(b) by 0 days.

(21) Appl. No.: 15/768,530

(22) PCT Filed: Oct. 12, 2016

(86) PCT No.: PCT/US2016/056589
§ 371 (c)(1),
(2) Date: Apr. 13, 2018

(87) PCT Pub. No.: WO2017/066286
PCT Pub. Date: Apr. 20, 2017

(65) Prior Publication Data
US 2018/0290627 A1    Oct. 11, 2018

Related U.S. Application Data

(60) Provisional application No. 62/240,658, filed on Oct. 13, 2015, provisional application No. 62/328,110, filed on Apr. 27, 2016.

(51) Int. Cl.
*B60R 25/24* (2013.01)
*G07C 9/00* (2006.01)

(52) U.S. Cl.
CPC ........ *B60R 25/245* (2013.01); *G07C 9/00182* (2013.01); *G07C 2009/00301* (2013.01);
(Continued)

(58) Field of Classification Search
CPC ............. B60R 25/245; G07C 9/00182; G07C 2009/00301; G07C 2009/007769; G07C 2209/63
(Continued)

(56) References Cited

U.S. PATENT DOCUMENTS

| 6,043,753 A * | 3/2000 | Okayasu ............ G07C 9/00182 340/12.22 |
| 2003/0080875 A1* | 5/2003 | Wathen .............. G07C 9/00182 340/12.22 |

(Continued)

FOREIGN PATENT DOCUMENTS

| JP | 2009208741 A | 9/2009 |
| JP | 2012-172367 A | 9/2012 |
| KR | 10-2003-0066549 A | 8/2003 |

OTHER PUBLICATIONS

International Search Report dated Jan. 25, 2017 for International Application No. PCT/US2016/056589.

*Primary Examiner* — Ojiako K Nwugo
(74) *Attorney, Agent, or Firm* — Skyler R. Lund

(57) ABSTRACT

A remote access system for a vehicle may include at least one receiver configured to detect a location of a mobile device, and a controller having a processor. The processor may be configured to determine an association of the mobile device to an authorized user when the mobile device is within a first range from the vehicle, and authenticate the user when the mobile device is within a second range from the vehicle, wherein the second range is smaller than the first range. The processor may also be configured to determine a vehicle function to perform based on data associated with the mobile device or the user, and perform the vehicle function when the mobile device is within a third range from
(Continued)

the vehicle and the user is authenticated, wherein the third range is smaller than the second range.

20 Claims, 8 Drawing Sheets

(52) U.S. Cl.
CPC .............. *G07C 2009/00769* (2013.01); *G07C 2209/63* (2013.01)

(58) Field of Classification Search
USPC .................................................. 340/5.2–5.74
See application file for complete search history.

(56) References Cited

U.S. PATENT DOCUMENTS

| | | | | |
|---|---|---|---|---|
| 2006/0119469 | A1* | 6/2006 | Hirai | .................. G07C 9/00111 340/5.61 |
| 2007/0200668 | A1* | 8/2007 | Kurpinski | ........... B60R 25/2009 340/5.64 |
| 2013/0090783 | A1* | 4/2013 | Katou | ..................... B60R 25/24 701/2 |
| 2013/0332007 | A1* | 12/2013 | Louboutin | ............ H04W 4/021 701/2 |
| 2015/0105944 | A1* | 4/2015 | Louboutin | ............ H04W 4/021 701/2 |
| 2015/0184628 | A1* | 7/2015 | Fan | .................... G07C 9/00182 701/2 |
| 2015/0372832 | A1* | 12/2015 | Kortz | ..................... G05B 15/02 700/278 |
| 2016/0110572 | A1* | 4/2016 | Kalhous | ............. G06K 7/10366 340/10.1 |
| 2016/0267734 | A1* | 9/2016 | Hamada | ............. G07C 9/00309 |
| 2016/0358391 | A1* | 12/2016 | Drako | ................ G07C 9/00103 |
| 2017/0144630 | A1* | 5/2017 | Katou | ..................... B60R 25/24 |

\* cited by examiner

SEAMLESS VEHICLE ACCESS SYSTEM

CROSS REFERENCE TO RELATED APPLICATIONS

This application is a National Phase application under 35 U.S.C. § 371 of International Application No. PCT/US2016/056589 filed on Oct. 12, 2016, which claims the benefit of priority from U.S. Provisional Patent Application No. 62/240,658 filed on Oct. 13, 2015, and U.S. Provisional Patent Application No. 62/328,110, filed on Apr. 27, 2016, the entire disclosures of which are incorporated by reference.

TECHNICAL FIELD

The present disclosure relates generally to a seamless vehicle access system, and more particularly, to a remote access system for a vehicle based on detection of a mobile device.

BACKGROUND

Keyless access has become common in the automotive industry. Keyless access often includes a fob that enables remote control of vehicle components, such as doors, windows, and/or a motor. The fob communicates with the vehicle over a short-range wireless network, and typically has buttons that need to be pressed by the user to access the vehicle.

However, keyless access control through the fob can be limited in functionality in that the control is not automatically initiated unless the buttons are pressed. Such conventional access control also does not intelligently determine which door to open based on the person's moving trajectory toward the vehicle. Although conventional fobs can unlock the doors upon pressing of buttons, they does not enable the doors to automatically open. Furthermore, the fob does not provide for additional security measures that prevent unauthorized access to the vehicle. It would be desirable to provide a seamless vehicle access system based on interactive and/or predictive technology.

The disclosed remote access system is directed to mitigating or overcoming one or more of the problems set forth above and/or other problems in the prior art.

SUMMARY

One aspect of the present disclosure is directed to a remote access system for a vehicle. The remote access system may include at least one receiver configured to detect a location of a mobile device, and a controller having a processor. The processor may be configured to determine an association of the mobile device to an authorized user when the mobile device is within a first range from the vehicle, and authenticate the user when the mobile device is within a second range from the vehicle, wherein the second range is smaller than the first range. The processor may also be configured to determine a vehicle function to perform based on data associated with the mobile device or the user, and perform the vehicle function when the mobile device is within a third range from the vehicle and the user is authenticated, wherein the third range is smaller than the second range.

Another aspect of the present disclosure is directed to a method of remote access for a vehicle. The method may include detecting, with at least one receiver, a location of a mobile device when the mobile device is within a first range, determining, with a processor of, an association of the mobile device to an authorized user. The method may further include authenticating, with the processor, the user based on the mobile device being detected within a second range from the vehicle, wherein the second range is smaller than the first range. The method may also include determining, with the processor, a vehicle function to perform based on data associated with the mobile device or the user, and performing, with the processor, the vehicle function when the mobile device is detected within a third range from the vehicle and the user is authenticated, wherein the third range is smaller than the second range.

Yet another aspect of the present disclosure is directed to a vehicle. The vehicle may include a frame, and a remote access system. The access system may include at least one receiver positioned in or on the frame and configured to detect a location of a mobile device, and a controller having a processor. The processor may be configured to determine an association of the mobile device to an authorized user when the mobile device is detected within a first range from the vehicle, and authenticate the user based on the mobile device being detected within a second range from the vehicle, wherein the second range is smaller than the first range. The processor may also be configured to determine a vehicle function to perform based on data associated with the mobile device or the user, and perform the vehicle function when the mobile device is detected within a third range from the vehicle and the user is authenticated, wherein the third range is smaller than the second range.

BRIEF DESCRIPTION OF THE DRAWINGS

FIG. 4a is a second diagrammatic overhead illustration of an exemplary embodiment of the exemplary vehicle of FIG. 1-3.

FIG. 4b illustrates an exemplary predictive model that may be associated with the diagrammatic overheard illustration of FIG. 4a.

FIG. 5 is a block diagram of an exemplary access system that may be used with the exemplary vehicle of FIGS. 1-4a.

DETAILED DESCRIPTION

The disclosure is generally directed to a seamless vehicle access system. In some embodiments, the access system may be configured to detect the location of a mobile device of an authorized user over a short-range wireless network (e.g., Bluetooth Low Energy, BLE). In some embodiments, the access system may also authenticate the user, for example, through dual pass authentication, certificate data stored on the mobile device, and/or biometric data, it is contemplated that, in some embodiments, the access system may be configured to selectively activate a camera of the vehicle based on the detection of the mobile device of the authorized user. It is further contemplated that the access system may be configured to perform vehicle functions (e.g., unlock and/or open a door) based on predictive modeling and/or gesture recognition via the camera.

Figure 1:
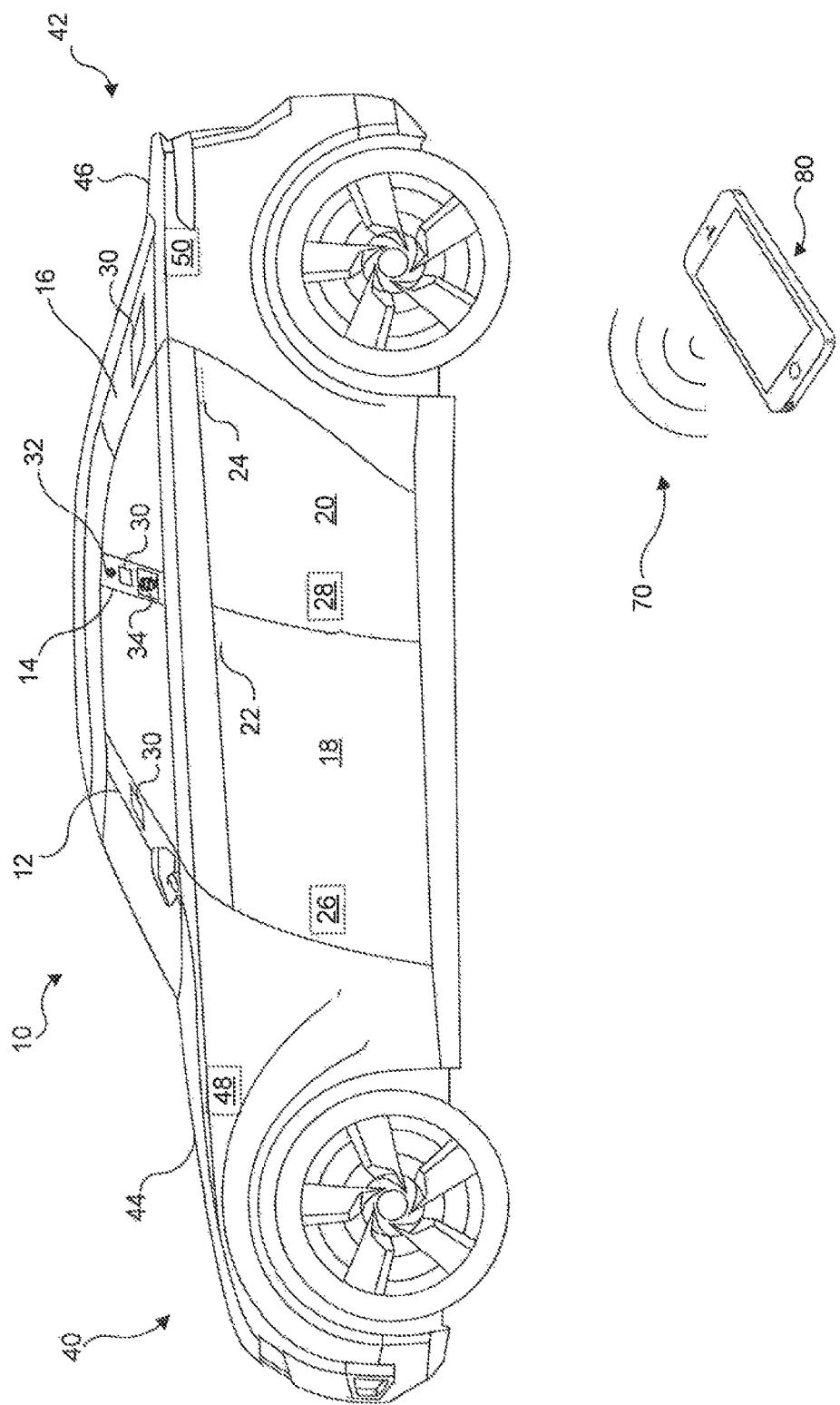
FIG. 1 is a diagrammatic illustration of an exemplary embodiment of an exemplary vehicle.

FIG. 1 is a diagrammatic illustration of an exemplary embodiment of an exemplary vehicle 10. Vehicle 10 may have any body style, such as a sports car, a coupe, a sedan, a pick-up truck, a station wagon, a sports utility vehicle (SUV), a minivan, or a conversion van. Vehicle 10 may be an electric vehicle, a fuel cell vehicle, a hybrid vehicle, or a conventional internal combustion engine vehicle. Vehicle 10 may be configured to be operated by a driver occupying vehicle 10, remotely controlled, and/or autonomously.

Figure 5:
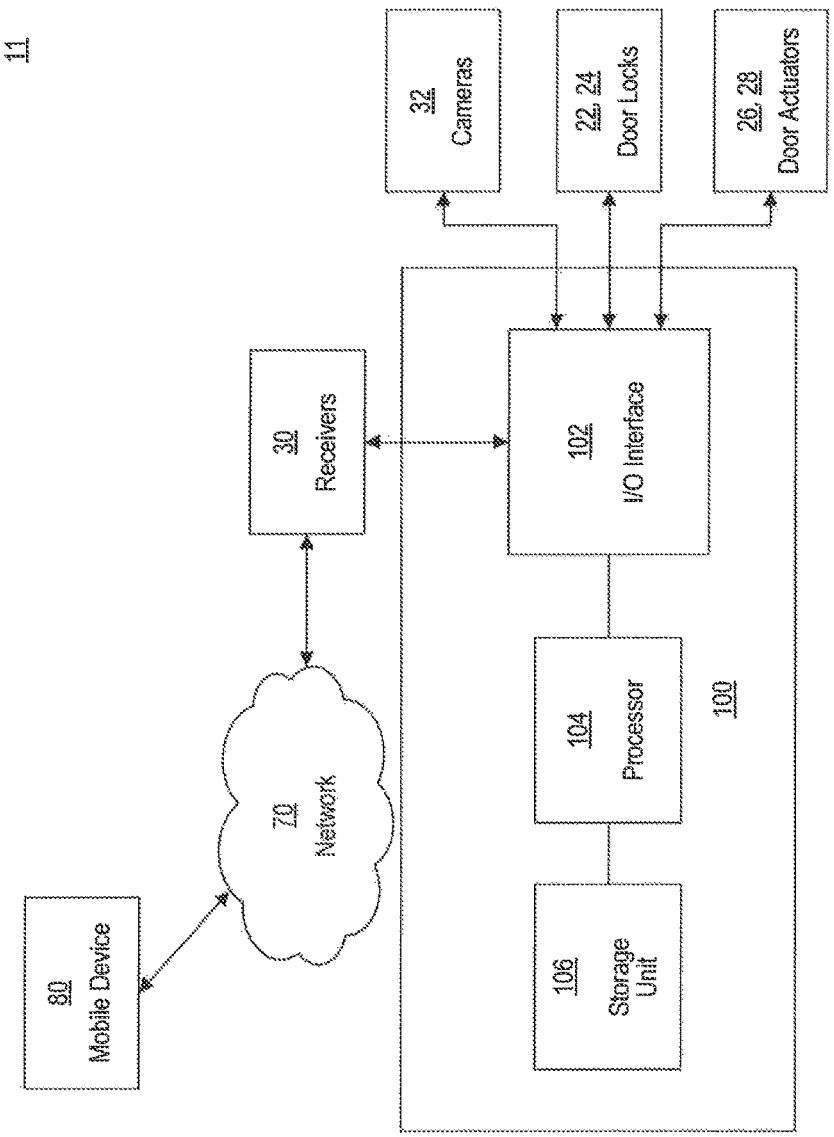

As illustrated in FIG. 1, vehicle 10 may include a frame having a front end 40, a rear end 42, and a plurality of pillars, such as an A-pillar 12, a B-pillar 14, and a C-pillar 16 on each side of vehicle 10. Vehicle may also include a plurality of doors 18-21 (doors 19 and 21 depicted in FIG. 3) that may allow access to a cabin, and each door 18-21 may be secured with respective locks, such as locks 22, 24. Vehicle 10 may also include a front hood 44 configured to enclose front storage space, and a rear hood 46 configured to enclose rear storage space. In some embodiments, doors 18-21 and hoods 44, 46 may be handleless and actuated by door actuators, such as door actuators 26, 28 and hood actuators 48, 50. Actuators (e.g., 26, 28, 48, 50) may include a variety of different structures that may open and close doors (e.g., 18, 20) and/or hoods (e.g., 44, 46) based on signals from a controller. For example, FIG. 5 is a block diagram of an exemplary access system 11 that may be used with exemplary vehicle 10, and access system 11 may include a controller 100. For example, in some embodiments, door actuators 26, 28 may include a hydraulic arm (not shown) with a first end secured to the frame and a second end secured to one of doors 18, 20. In some embodiments, the door actuators 26, 28 may include a gear mechanism configured to actuate a lever (not shown) secured to one of doors 18, 20. Door actuators 26, 28 may include additional structure configured to open and close windows of doors 18 and 20, and/or unlock door locks 22, 24. Door actuators 26, 28 may also include one or more motors that may be actuated by a signal generated and transmitted by controller 100 (depicted in FIG. 5) in order to effectuate the desired vehicle function. Hood actuators 48, 50 may include similar structures as door actuators 26, 28 and be configured to open hoods 44, 46.

Vehicle 10 may include at least one receiver 30 configured to detect the location of mobile devices 80 within a range, and access data from mobile devices 80. For example, receiver(s) 30 may be configured to detect a beacon from enabled devices (e.g., a mobile device 80) over a short-range network 70. In some embodiments, vehicle 10 may include a plurality of receivers 30 that may triangulate the position of the mobile device 80 relative to doors 18-21. Receiver(s) 30 may be positioned in and/or on the frame, for example, receiver(s) 30 may be positioned in a computer onboard vehicle 10 and/or on one or more of pillars 12-16. As depicted in FIGS. 1-4a, receiver(s) 30 may be positioned on each of A-pillar 12, B-pillar 14, and C-pillar 16 and configured to triangulate mobile device 80 located proximate thereof. Receiver(s) 30 may also be positioned on front hood 44 and rear hood 46. Receiver(s) 30 may be configured to access data from mobile device 80, such as a digital signature that may identify authorized users and certificate data that may be used to authenticate the authorized users.

Vehicle 10 may also include at least one camera 32 externally mounted and configured to capture images and/or video of users outside of vehicle 10. For example, as depicted in FIGS. 1-3a, camera(s) 32 may be located on one or more pillars 12-16, such as B-pillar 14, front hood 44, and/or rear hood 46. Camera(s) 32 may include any device configured to capture videos and/or images of the area surrounding vehicle 10 and generate signals and/or data to be processed to visually detect the surrounding environment. For example, camera(s) 32 may be used in conjunction with image and video processing software, e.g., image recognition software, such that the software may distinguish a person from inanimate objects, and distinguish identities, facial features, and/or other biometric aspects of users. Software may also be configured to detect gestures by the people based on relative positions and movements of facial features, heads, arms, fingers, legs, and/or feet. Camera(s) 32 may be configured to be adjusted by a motor (not shown) to improve a video and/or an image of the user. For example, one or more motor(s) may be configured to tilt camera(s) 32 in a horizontal and/or vertical plane to substantially center the user(s) in the frame. The motor(s) may also be configured to adjust the focal point of the camera(s) 32 to enhance detection of the user(s).

In some embodiments, camera(s) 32 may be linked with receiver(s) 30, or otherwise communicating and sharing information with receiver(s) 30. Information detected or collected by receiver(s) 30 may be used to assist camera(s) 32 and improve the accuracy of its gesture recognition. For example, controller 100 may be configured to actuate the motor(s) to adjust camera(s) 32 based on a location of a user relative to vehicle 10 detected by receiver(s) 30. Alternatively, information acquired by camera(s) 32 may be aggregated with information collected by receiver(s) 30, and the aggregated data is used for gesture detection. As another example, information collected by receiver(s) 30 may be used to perform first step(s) of a vehicle function (e.g., unlock a door), while information acquired by camera(s) 32 may be used to perform subsequent step(s) (e.g., open the door). As yet another example, receiver(s) 30 and camera(s) 32 may both be used for performing the same vehicle function, as a more secure, two step method.

Vehicle 10 may further include one or more user interfaces 34 configured to display videos and/or images. For example, user interface 34 may have a display including an LCD, an LED, a plasma display, or any other type of display. User interface 34 may also provide a graphical user interface (GUI) presented on the display for user input and data display. User interface 34 may further include input devices, such as a touchscreen and/or a tracker ball. In some embodiments, user interface 34 may be positioned on B-pillar 14, on front hood 44, and/or on rear hood 46.

Mobile device 80 may be any structure configured to transmit and receive data to/from controller 100, via receiver(s) 30. Mobile device 80 may include a smart phone, a tablet, a personal computer, a fob, and/or a wearable device, such as a transmitting tag, smart glasses, or a smart watch (e.g., Apple Watch™). Mobile device 80 may include a gyroscope configured to detect a movement of mobile device 80 according to gestures of the user. For example, mobile device 80 may include a smart watch configured to detect hand gestures of the user, and transmit an indicative signal to receiver(s) 30. In some embodiments, mobile device 80 may be a seamless fob of an ornamental design. Mobile device 80 may also be programmed to be associated with a variety of different users of vehicle 10. In some embodiments, after being paired with mobile device 80, vehicle 10 (e.g., with controller 100) may be configured to recognize mobile device 80 based on data stored in controller 100. For example, the stored data may include the person's name and the person's relationship with vehicle 10 according to a digital signature emitted by mobile device 80. The digital signature of authentication mechanisms 90 may include a determinative emitted radio frequency (RF) or a GPS tag.

Network 70 may include a number of different types of wired or wireless networks to enable communication between mobile device 80 and controller 100. In some embodiments, network 70 may include a short-range wireless network, enabling radiofrequency (RF) communication. For example, network 70 may include a Bluetooth Low Energy (BLE) network enabling transmission of low-powered signals, for example, over RF channels having 2 MHz of bandwidth. In some embodiments, network 70 may include near field communication (NFC) enabling mobile device 80 to share data with controller 100 when within a close proximity.

Figure 2:
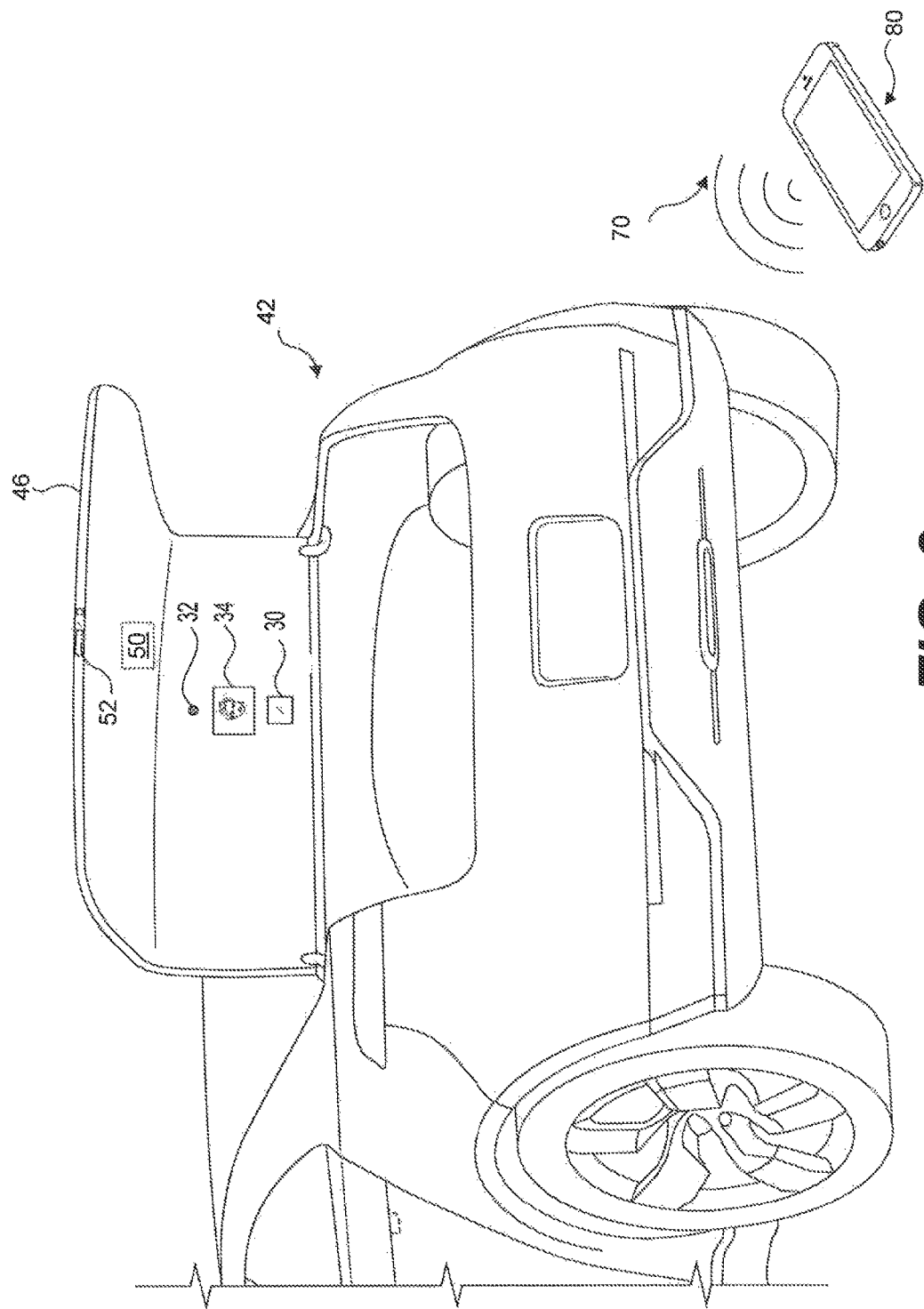
FIG. 2 is a diagrammatic illustration of a rear end of an exemplary embodiment of the exemplary vehicle of FIG. 1.

FIG. 2 is a diagrammatic illustration of rear end 42 of vehicle 10. As illustrated in FIG. 2, rear hood 46 may enclose storage space to hold items, such as luggage, groceries, and/or other objects. A hood lock 52 may be configured to secure rear hood 46 in a closed position, and hood actuator 50 may be configured to open and close rear hood 46 when unlocked. Rear end 42 may also include receiver 30, camera 32, and interface 34. In some embodiments, receiver 30, camera 32, and interface 34 can be located on the interior of rear hood 46, however, one or more receivers, cameras, and/or interfaces can additionally or alternatively be located on the exterior of rear end 42. In some embodiments, when a user is detected approaching or near vehicle 10 (e.g., receiver 30 detecting the location of mobile device 80), controller 100 may turn on camera 32 to capture video and/or images of the user. Controller 100 may then perform facial recognition on the captured video and/or images to detect and verify the identity of the user. Based on the detection of an authorized user and/or mobile device 80, controller 100 may be configured to generate and transmit a signal to hood actuator 50 in order to open and close rear hood 46, for example, as discussed regarding FIG. 3.

Figure 3:
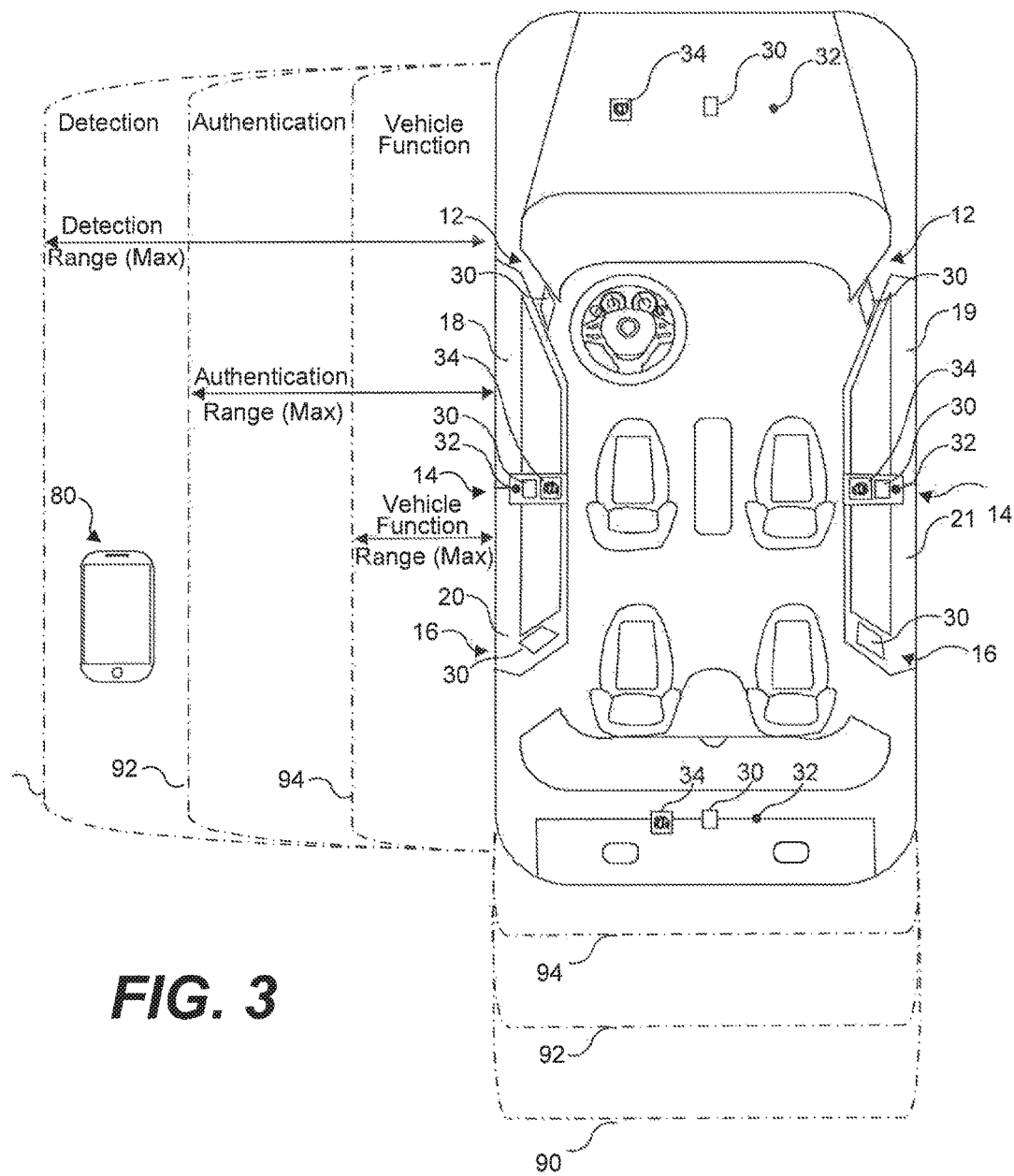
FIG. 3 is a first diagrammatic overhead illustration of an exemplary embodiment of the exemplary vehicle of FIGS. 1-2.

FIG. 3 is a diagrammatic overhead illustration of an exemplary embodiment of vehicle 10. As the user approaches vehicle 10, controller 100 may be configured to perform a plurality of vehicle functions based on detection of mobile device 80 in one or more ranges 90-94 based on a distance from one or more doors 18-21 and/or hoods 44, 46. For example, mobile device 80 may be detected within a detection range 90, an authentication range 92 (e.g., within about 10 meters of vehicle 10), and a vehicle function range 94 (e.g., within about 2 meters of vehicle 10). In some embodiments, detection range 90 may be defined by the maximum range that mobile device 80 is detectable by receiver(s) 30. In some embodiments, detection range 90 may be configured to be less than the maximum range (e.g., within about 30 meters of vehicle 10). Generally, access system 11 (FIG. 5) may enable seamless access to vehicle 10 based on predictive modeling and/or gesture recognition, without user actuation of any mechanical systems (e.g., a door handle).

For example, when mobile device 80 is in detection range 90, controller 100 may be configured to detect the location of mobile device 80 relative to vehicle 10. Controller 100 may also access data emitted by mobile device 80 to determine whether mobile device 80 is authorized (e.g., associated with an authorized user). For example, a user may initially pair mobile device 80 with controller 100 to provide authorization to vehicle 10 based on a digital signature (e.g., a wireless signal) of mobile device 80. Therefore, when within detection zone 90, mobile device 80 may be detected by controller 100 when mobile device 80 is either in full sight or enclosed in a container and/or a garment. In some embodiments, controller 100 may also be configured to track the movement of mobile device 80, when detected within detection zone 90. For example, controller 100 may continuously detect the location of mobile device and store the data in a storage unit 106 (as depicted in FIG. 5).

When mobile device 80 is in authentication range 92, controller 100 may perform a variety of functions to authenticate the user and/or mobile device 80 based on mobile device 80 being authorized. In some embodiments, controller 100 may be configured to authenticate mobile device 80 through a dual pass authentication. For example, mobile device 80 may transmit and receive data to/from controller 100 in two parallel pathways, such as 1) connecting to controller 100 directly through network 70, and 2) connecting to a trusted source (e.g., a secure server) which validates mobile device 80 and connects to controller 100. In some embodiments, controller 100 may be configured to authenticate mobile device 80 in an offline mode. For example, mobile device 80 may store certificate data locally, which may be accessed by controller 100 through network 70. The stored certificate data may be downloaded from a trusted source and have a limited half-life (e.g., days or weeks) to ensure the authentication of mobile device 80. In some embodiments, the user may also be authenticated through distance biometric data (e.g., facial recognition, iris scanning, and/or speech recognition). For example, in some embodiments, the detection of an authorized mobile device 80 may initiate controller 100 to activate camera(s) 32. Camera(s) 32 may capture an image of the user, and controller 100 may compare the captured image to profiles of authorized users stored in storage unit 106. For example, facial recognition or other image processing methods may be used to recognize authorized users. If the captured image sufficiently matches the stored profile, the user may be authenticated.

When mobile device 80 is in authentication range 92, controller 100 may also collect data in order to determine an intent of the user based on predictive modeling and/or gesture recognition. For example, controller 100 may be configured to capture data points of the location of mobile device 80 and determine a pathway of the user, as discussed in connection with FIGS. 3a-b. Controller 100 may also be configured to activate camera 32 which may capture gestures from the user (e.g., through images and/or video) indicative of an intent of the user. In some embodiments, the user may store predefined gestures that may be correlated to desired vehicle functions. For example, exemplary gestures may include nodding a head, waving a hand, extending one or more fingers, winking an eye, and/or combinations thereof. The vehicle functions may include opening door(s) 18-21 and/or hood(s) 44, 46, unlocking door(s) 18-21 and/or hood(s) 44, 46, rolling down a window of door(s) 18-21, adjusting seat(s) to predefined settings, starting a powertrain, starting an HVAC system, enabling an infotainment system, and/or combination thereof. In some embodiments, the user may provide a first gesture for a first vehicle function, a second gesture for a second vehicle function, and so forth. For example, the user may raise an index finger in order to open door 18, raise a combination of an index finger and a middle finger in order to open door 20, wave a right hand in order to open a window of door 18, and/or wave a left hand in order to open a window of door 20. In some embodiments, the gesture may be captured through gyroscopic data collected from mobile device (e.g., a smart watch). For example, a wave of a hand may be detected through gyroscopic data collected by a smart watch on the respective hand.

Controller 100 may be configured to perform computer learning based on the captured gestures. For example, controller 100 may perform a training process to train a classifier based on training data, e.g., gestures that are associate with known user intent. Controller 100 may then use the classifier on captured gestures and associate them with the user intents. In some embodiments, in order to improve accuracy and reduce false positives, controller 100 may be configured to add the captured gestures into the training data, once the gestures are correctly classified. For example, controller 100 may compile the captured gestures into gesture recognition patterns.

In some embodiments, controller 100 may be configured to actuate cameras) 32 based on detection of mobile device 80 to improve intelligence and accuracy. For example, controller 100 may be configured to tilt camera(s) 32 and/or adjust a focal point of camera(s) 32 based on the approach of the user in order to enhance the resolution of the image. Controller 100 may also be configured to process the image based on the detected angle and distance of the image. For example, controller 100 may be configured to determine the relative size of the user visible from the detected distance or determine which facial features would be visible when the user is approaching at the detected angle. Based on an expected image of the user from the detected angle and distance, controller 100 may be configured to enhance the recognition of the user and the capture of gestures.

When mobile device 80 moves into vehicle function range 94, controller 100 may perform the vehicle function, based on detection, authentication, and/or determination of an intent. For example, if an authenticated user is detected on a pathway towards door 18, controller 100 may actuate door actuator 26 in order to open door 18. In another example, if an authenticated user displays a predefined gesture (e.g., raising an index finger) and is detected proximate to door 18, controller 100 may also actuate door actuator 26 in order to open door 18. Performance of the vehicle function when mobile device 80 is at vehicle function range 94 may reduce the chances of a false positive (e.g., an incorrect door opening) because controller 100 may collect sufficient data within detection range 90 and/or authentication range 92 to determine the intent. For example, the pathway of the user may not be determinative until the user is sufficiently close (e.g., within vehicle function range 94). Furthermore, gesture recognition may not be effectuated until it is determinative that the user intends to enter vehicle 10. Controller 100 may be configured to unlock and/or open doors 18-21 or front and rear hoods 44, 46.

Figures 4A, 4B:
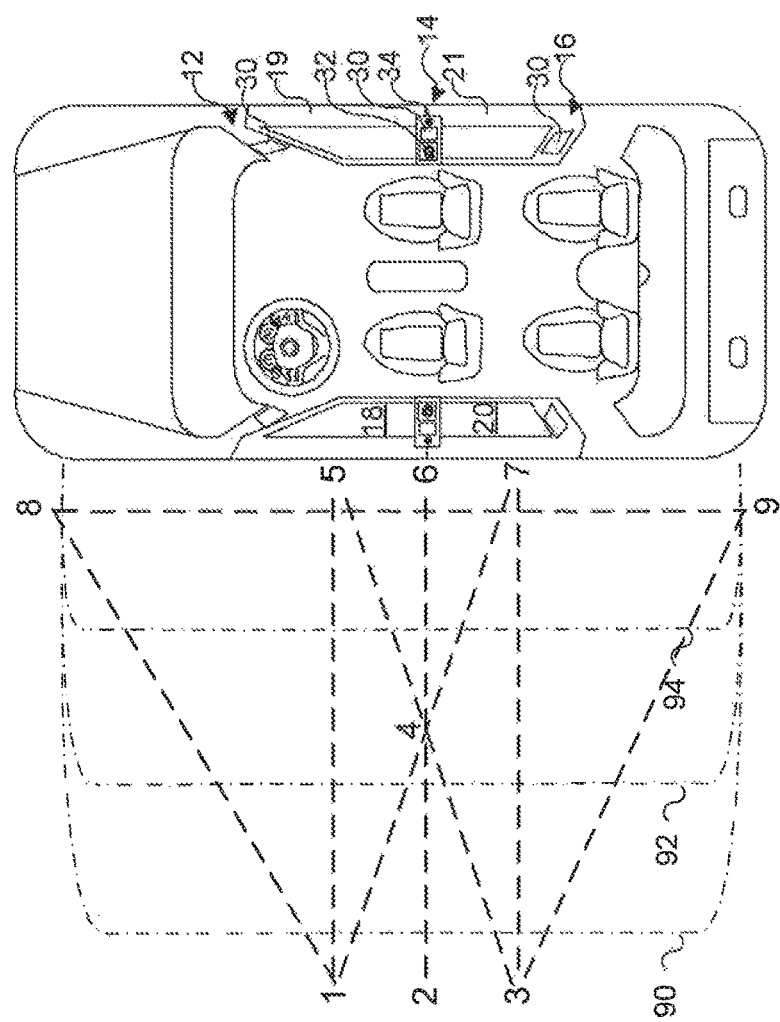

FIG. 4*a* is a diagrammatic overhead illustration of an exemplary embodiment of vehicle 10. The user may approach vehicle 10 in a variety of different pathways that may indicate the desired interaction with vehicle 10. As depicted in FIG. 4*a*, when mobile device 80 is located in detection range 90, controller 100 may track locations of mobile device 80 to operate predictive modeling and determine the intent of the user. For example, controller 100 may be configured to track mobile device 80 and record relative locations to vehicle 10, as indicated as reference numbers 1-9 in FIG. 4*a*. The number of locations is only exemplary, and, in some embodiments, controller 100 may detect mobile device 80 continuously when within detection range 90. In some embodiments, the determination may be based on linear or polynomial regression of discrete recorded locations of mobile device 80. The pathway of mobile device 80 may be record, for example, in storage unit 106.

FIG. 4*b* illustrates an exemplary predictive model 200 of the diagrammatic overheard illustration of FIG. 4*a*. Predictive model 200 may include a first field 202 having data indicating movement trajectory data of mobile device 80, and a second field 204 correlating vehicle functions to the movement trajectory data. For example, controller may access the recorded pathway of mobile device 80 in storage unit 106 and compare it to trajectory data of field 202. If the recorded pathway sufficiently matches data of field 202, controller 100 may generate a signal to a corresponding motor to perform the vehicle function of field 204. For example, if the recorded pathway sufficiently matches trajectory 1-4-5, controller 100 may be configured to generate and transmit a signal to door actuator 26 in order to automatically open door 18. However, if the recorded pathway sufficiently matches trajectory 1-8, controller 100 may determine that the user does not have an intent to enter doors 18, 20, so controller 100 may perform no action. If the recorded pathway sufficiently matches trajectory 3-9, controller 100 may be configured to generate and transmit a signal to turn on receiver 30 and/or camera 32 located at rear end 42 of vehicle 10, which may detect the user and send signals to automatically open hood 46. In some embodiments, controller 100 may access predictive model 200 when mobile device 80 enters vehicle function range 94 in order to reduce false positives (e.g., opening a wrong door).

In some embodiments, controller 100 may be configured to perform a vehicle function based on the location of the user and/or vehicle 10. For example, controller 100 may determine that the vehicle may be parked near a grocery store, and that the user may be coming back to the vehicle, based on signals received from, e.g., camera 32 and mobile phone 80. Controller 100 may generate and transmit a signal to hood actuator 50 to unlock and open the rear hood 46 based on the location information of the user and/or vehicle 10.

In some embodiments, controller 100 may be configured to perform a vehicle function based on calendar of the user. For example, storage unit 106 may store calendar data of one or more users. The calendar data may be synchronized with mobile device 80 and/or other personal devices of the user. Controller 100 may be configured to access calendar data of the user stored in storage 163 (or stored remotely on mobile device 80). For example, controller 100 may determine that the user may have a meeting at 9 a.m., and the operator may begin to drive to the meeting at 8:30 a.m. Controller 100 may generate a signal and transmit to the actuator 26 to unlock and open the driver-side door 18 around 8:30 a.m.

FIG. 5 is a block diagram of an exemplary access system 11 that may be used with exemplary vehicle 10. As illustrated in FIG. 5, access system 11 may include controller 100 having, among other things, an I/O interface 102, a processor 104, and storage unit 106. One or more of the components of controller 100 may be included in an on-board computer of vehicle 10. These units may be configured to transfer data and send or receive instructions between or among each other.

I/O interface 102 may also be configured for two-way communication between controller 100 and various components of access system 11, such as door actuators 26, 28, door locks 22, 24, receivers 30, cameras 32, user interfaces 34, a powertrain, and/or an HVAC system via communication cables, wireless networks, or other communication mediums. I/O interface 102 may also send and receive operating signals to and from mobile device 80 through network 70 (e.g. via receiver(s) 30).

Processor 104 may be configured to receive and process signals to determine a plurality of conditions of the operation of vehicle 10. Processor 104 may also be configured to generate and transmit command signals, via I/O interface 102, in order to actuate the devices in communication. For example, processor 104 may be configured to actuate door actuators 26, 28, hood actuator 48, 50, unlock/lock door locks 22, 24 and hood lock 52, control cameras 32, and output media to interfaces 34. Processor 104 may also be configured to receive and process data from receivers, such as receiver(s) 30. Processor 104 may also be programmed to perform processes, as discussed herein.

Storage unit 106 may be configured to store one or more computer programs that may be executed by controller 100 to perform functions of access system 11. For example, storage unit 106 may be configured to store software for distance biometric detection of users, such as facial recognition, iris scanning, and/or voice recognition. Storage unit 106 may also be configured to store software to perform gesture recognition and modeling, as exemplified in FIG. 4b. Storage unit 106 may also be configured to store profiles of authorized users, such names, relationship to vehicle 10, and digital signatures of mobile devices 80 associated with the authorized users.

Figure 6:
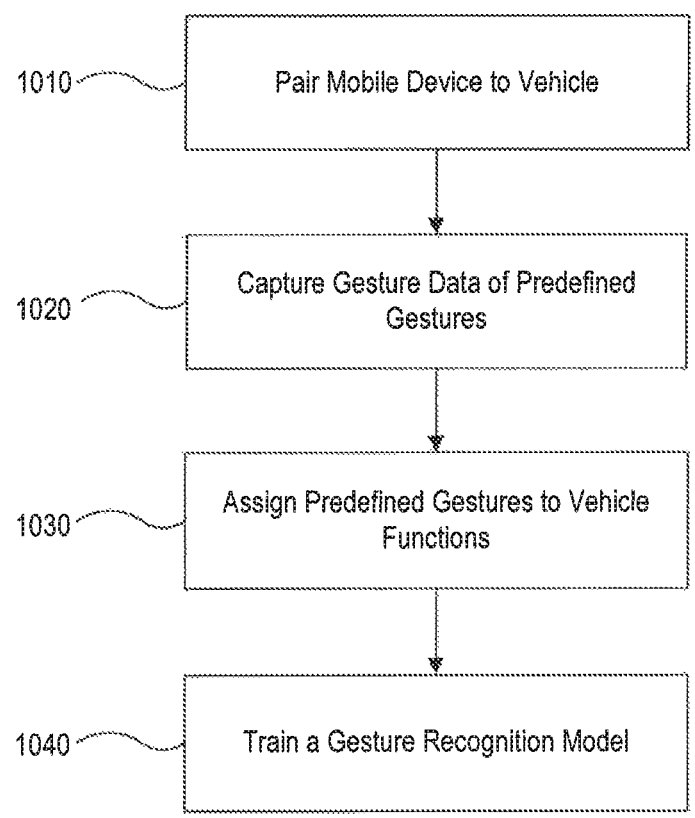
FIG. 6 is a flowchart illustrating a first exemplary method that may be performed by the exemplary access system of FIG. 5.

FIG. 6 is a flowchart illustrating an exemplary method 1000 that may be performed by processor 104 of controller 100. Method 1000 may be performed to initialize access system 11 and the interaction with mobile device 80 and user. Method 1000 may also be performed to enhance accuracy of access system and reduce false positives, by improving recognition of mobile device 80 and/or the user.

Step 1010 may include pairing mobile device 80 with vehicle 10. The pairing of step 1010 may include installing data into controller 100 that facilitates recognition of a digital signature of mobile device 80. In some embodiments, step 1010 may be performed at an OEM when initially manufacturing vehicle 10 and/or mobile device 80, for example, when mobile device 80 embodies a fob. In some embodiments, step 1010 may be performed after the initially manufacturing, such as when mobile device 80 is produced by third party manufacturers other than the OEM. The pairing of step 1010 may include associating mobile device 80 to an authorized user, and may include inputting the person's name and the person's relationship with vehicle 10.

Step 1020 may include capturing gesture data of predefined gestures. For example, step 1020 may include enabling camera 32 to capture video and/or images of the authorized user in order to recognize image patterns of predefined gestures. The predefined gestures may be recognized through facial features, head movement, arm movements, fingers movements, leg movement, and/or combinations thereof.

Step 1030 may include assigning predefined gestures to vehicle functions. In some embodiments, step 1030 may be performed by manual entry of the user. For example, controller 100 may allow the user to selectively assign predefined gestures to vehicle functions, such as opening doors 26, 28, opening windows of doors 26, 28, unlocking door locks 22, 24, and/or opening hoods 44, 46.

Step 1040 may include training a gesture recognition model (e.g., a classifier) that can automatically associate a gesture with a vehicle function. For example, controller 100 may use the predefined gestures and their associated vehicle functions as training data. Features may be extracted from the gestures and used to training the classifier, such that the classifier can correctly associate the predefined gestures to the known vehicle functions. In some embodiments, machine learning methods, such as Bayesian algorithms, may be used for training the classifier. The classifier can be later used to determine assign/associate a vehicle function to a gesture captured by cameras 32. Controller 100 may continuously compile training data sets based on captured gestures and the associated vehicle functions assigned by controller 100 to refine the classifier. Such a refining process may provide more accurate and encompassing gesture recognition.

Figure 7:
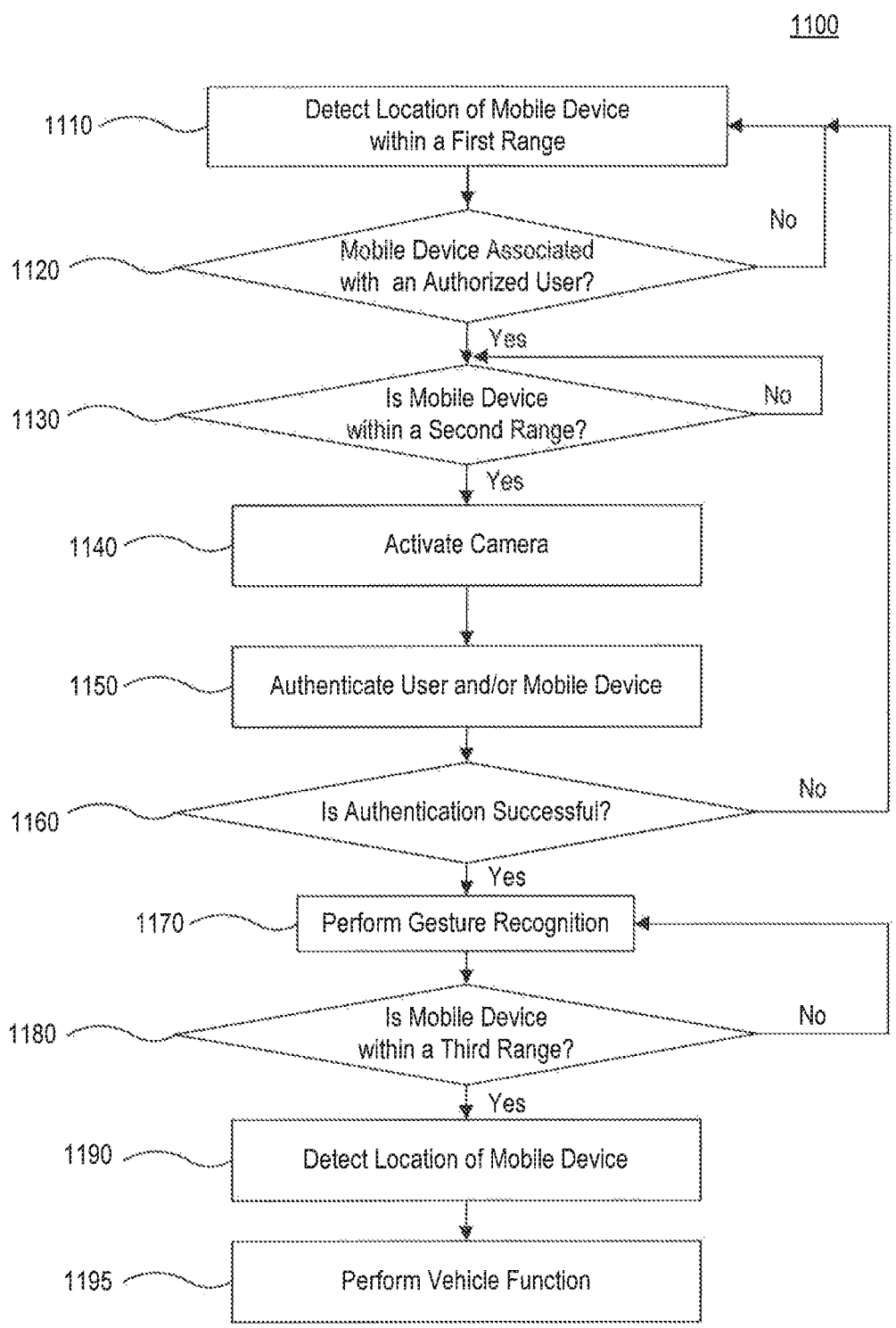
FIG. 7 is a flowchart illustrating a second exemplary method that may be performed by the exemplary access system of FIG. 5.

FIG. 7 is a flowchart illustrating an exemplary method 1100 that may be performed by access system 11. Method 1100 may perform vehicle functions based on gesture recognition.

In step 1110, controller 100 may detect a location of mobile device 80 within a first range (e.g., detection range 90). For example, controller 100 may detect mobile device 80 through emitted signals over network 70 received by receivers 30. Network 70 may include a BLE network, and, in some embodiments, detection range 90 may be defined by the maximum detectable range of network 70. In some embodiments, detection range 90 may be defined by a distance shorter than the maximum detectable range of network 70.

In step 1120, controller 100 may determine whether mobile device 80 is associated with an authorized user. In some embodiments, controller 100 may receive a digital signature from mobile device 80, via receivers 30, and compare it to digital signatures of authorized mobile devices. If mobile device 80 is not authorized, controller 100 may return to step 1110 to detect mobile devices 80. If mobile device 80 is authorized, controller 100 may proceed to step 1130.

In step 1130, controller 100 may determine if the mobile device is within a second range (e.g., authentication range 92). If mobile device 80 is not within authentication range 92, controller 100 may continue to detect and monitor the location of mobile device 80. If mobile device 80 is within authentication range 92, controller 100 may proceed to step 1140.

In step 1140, controller 100 may activate cameras) 32. Activation of camera(s) 32 based on detection and authorization of mobile device 80 may conserve battery power while also enabling authentication and/or gesture recognition. Step 1130 may also include adjusting camera(s) 32 to focus on the user of the detected mobile device.

In step 1150, controller 100 may authenticate the user and/or mobile device 80. The authentication of step 1150 may include a number of different determinations. In some embodiments, controller 100 may be configured to authenticate mobile device 80 through a dual pass authentication and/or detection of certificate data stored on mobile device 80. In some embodiments, user may also be authenticated through distance biometric data (e.g., facial recognition, iris scanning, and/or speech recognition). For example, camera(s) 32 may capture an image of the user, and controller 100 may compare the captured image to profiles of authorized users stored in storage unit 106. If the captured image sufficiently matches the stored profile, the user may be authenticated. In some embodiments, controller 100 may perform a two-step authentication method by authenticating both the user and mobile device 80 for increased security measures.

In step 1160, controller 100 may determine whether the authentication is successful. If the user and/or mobile device 80 is not authenticated, controller 100 may return to step 1110 to detect mobile devices 80. If mobile device 80 is authenticated, controller 100 may proceed to step 1170.

In step 1170, controller 100 may perform gesture recognition. In some embodiments, controller 1170 may capture video and/or images from camera(s) 32, and access gesture data stored in storage unit 106 in step 1020. Controller 1170 may compare captured gestures to stored gesture data in order to determine an intent of the user. For example, if a captured hand gesture matches gesture data stored in storage unit 106, controller 100 may determine that the user has an intent to perform a corresponding vehicle function (e.g., open a door or a hood).

In step 1180, controller 100 may determine whether mobile device 80 is within a third range (e.g., vehicle function range 94). If mobile device 80 is not within vehicle function range 94, controller 100 may continue to perform gesture recognition of step 1170. If mobile device 80 is within vehicle function range 94, controller 100 may proceed to step 1190.

In step 1190, controller 100 may detect the location of mobile device 80. If mobile device 80 is detected proximate to a vehicle component (e.g., one of doors 18-21 or hoods 44, 46), controller 100 may match the gesture data to the respective vehicle component. For example, if controller 100 detects a gesture indicative of an intent to roll down a window and open a door within authentication range 92, and the user is detected adjacent to door 18 within vehicle function range 94, controller may determine that the user wants to roll down a window of door 18 and open door 18.

In step 1195, controller 100 may perform a vehicle function based on detection of mobile device 80 and captured gesture data. For example, controller 100 may generate and transmit a signal to an actuator (e.g., door actuator 18) to perform the vehicle function determined in the prior steps (e.g., roll down the window of door 18 and open door 18).

Figure 8:
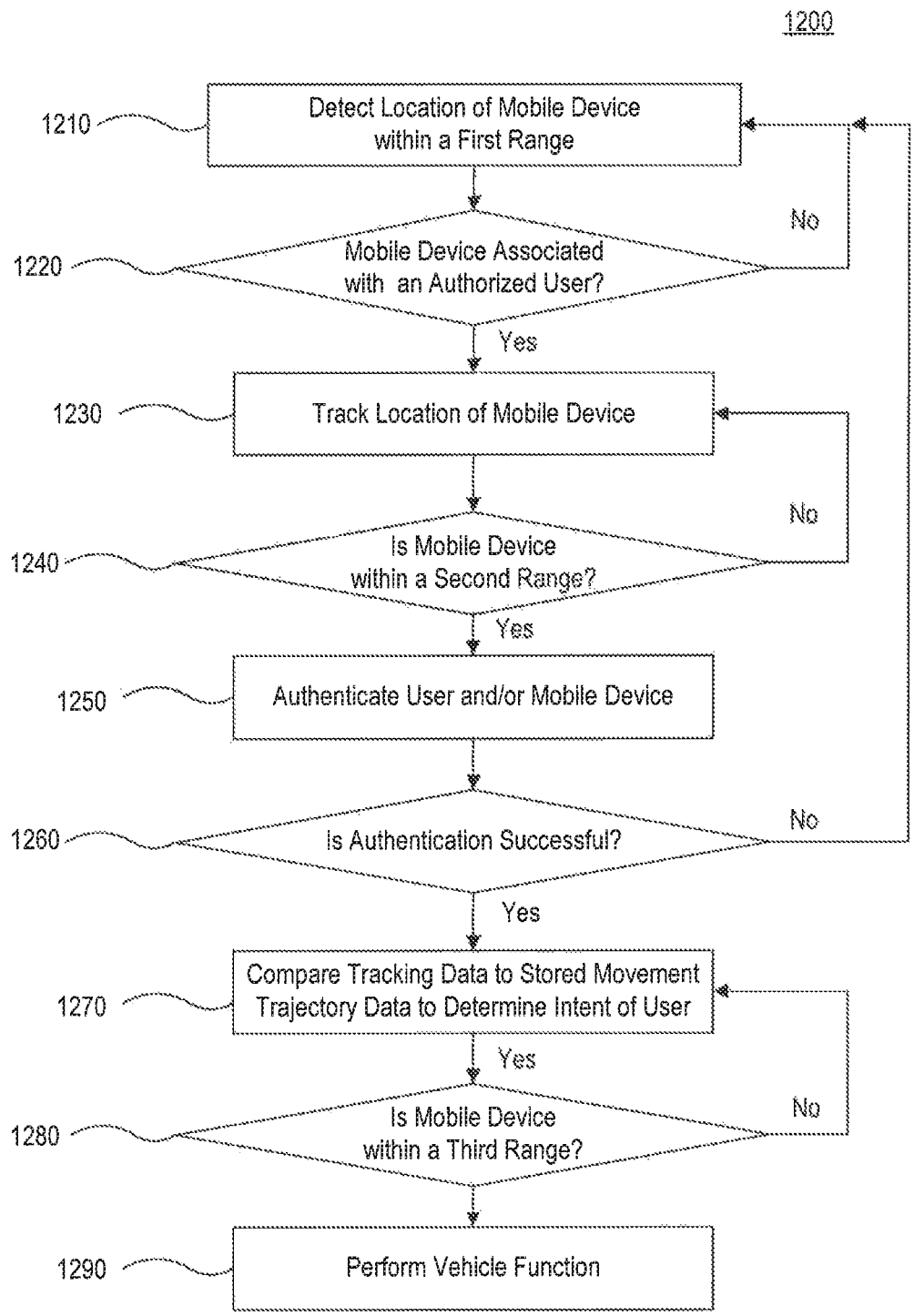
FIG. 8 is a flowchart illustrating a third exemplary method that may be performed by the exemplary access system of FIG. 5.

FIG. 8 is a flowchart illustrating an exemplary method 1200 that may be performed by access system 11. Method 1200 may perform vehicle functions based on predictive modeling.

In step 1210, controller 100 may detect a location of mobile device 80 within a first range (e.g., detection range 90). For example, controller 100 may detect mobile device 80 through emitted signals over network 70 received by receivers 30. Network 70 may include a BLE network, and, in some embodiments, detection range 90 may be defined by the maximum detectable range of network 70. In some embodiments, detection range 90 may be defined by a distance shorter than the maximum detectable range of network 70.

In step 1220, controller 1000 may determine whether mobile device 80 is associated with an authorized user. In some embodiments, controller 100 may receive a digital signature from mobile device 80, via receivers 30, and compare it to digital signatures of authorized mobile devices. If mobile device 80 is not authorized, controller 100 may return to step 1210 to detect mobile devices 80. If mobile device 80 is authorized, controller 100 may proceed to step 1230.

In step 1230, controller 100 may track a location of mobile device 80. For example, controller 100 may be configured to track mobile device 80 and record locations of mobile device 80 relative to vehicle 10, such as those exemplified as trajectories 1-9 on FIG. 4a.

In step 1240, controller 100 may determine whether mobile device 80 is within a second range (e.g., authentication range 92). If mobile device 80 is not within authentication range 92, controller 100 may continue to detect and monitor the location of mobile device 80. If mobile device 80 is within authentication range 92, controller 100 may proceed to step 1250.

In step 1250, controller 100 may authenticate the user and/or mobile device 80. The authentication of step 1250 may include a number of different determinations. In some embodiments, controller 100 may be configured to authenticate mobile device 80 through a dual pass authentication and/or detection of certificate data stored on mobile device 80. In some embodiments, user may also be authenticated through distance biometric data (e.g., facial recognition, iris scanning, and/or speech recognition). For example, camera(s) 32 may capture an image of the user, and controller 100 may compare the captured image to profiles of authorized users stored in storage unit 106. If the captured image sufficiently matches the stored profile, the user may be authenticated. In some embodiments, controller 100 may perform a two-step authentication method by authenticating both the user and mobile device. 80 for increased security measures.

In step 1260, controller 100 may determine whether the authentication is successful. If the user and/or mobile device 80 is not authenticated, controller 100 may return to step 1210 to detect mobile devices 80. If mobile device 80 is authenticated, controller 100 may proceed to step 1270.

In step 1270, controller 100 may compare tracking data to stored movement trajectory data to determine intent of the user. For example, controller may access the recorded pathway of mobile device 80 and predictive model 200 in storage unit 106. Controller 100 may then compare the recorded pathway to trajectory data of field 202. If the recorded pathway sufficiently matches data of field 202, controller 100 may determine intent to perform vehicle function of corresponding field 204.

In step 1280, controller 100 may determine whether mobile device 80 is within a third range (e.g., vehicle function range 94). If mobile device 80 is not within vehicle function range 94, controller 100 may continue to compare tracking data of step 1270. If mobile device 80 is within vehicle function range 94, controller 100 may proceed to step 1290.

In step 1290, controller 100 may perform a vehicle function based on detection and tracking of mobile device 80. For example, if intent to perform a vehicle function of field 204 is determined in step 1270, controller 100 may generate and transmit a signal to an actuator (e.g., door actuator 26) to initiate a vehicle function (e.g., open door 18).

Even though discussed separately, it is contemplated that methods 1100 and 1200 may be used in conjunction with each other. In some embodiments, the gesture recognition of method 1100 and the predictive modeling of method 1200 may be used in conjunction with each other in order to enhance recognition of an intent of the user. For example, the predictive modeling of method 1200 may be utilized to perform a first vehicle function (e.g., unlocking lock 22, 24 of respective door 18-21), and the gesture recognition of method 1100 may be utilized to perform a second vehicle function (e.g., opening respective door 18-21).

It is also contemplated that access system 11 may function without detection of mobile device 80. For example, access system 11 may enable a vehicle function based on only biometric data (e.g., facial recognition, iris scanning, and/or speech recognition), for example, when the user does not want to carry mobile device 80.

Another aspect of the disclosure is directed to a non-transitory computer-readable medium storing instructions which, when executed, cause one or more processors to perform the methods, as discussed herein. The computer-readable medium may include volatile or non-volatile, magnetic, semiconductor, tape, optical, removable, non-removable, or other types of computer-readable medium or computer-readable storage devices. For example, the computer-readable medium may be the storage unit having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed access system and related methods. Other embodiments will be apparent to those skilled in the art from consideration of the specification and practice of the disclosed access system and related methods. It is intended that the specification and examples be considered as exemplary only, with a true scope being indicated by the following claims and their equivalents.

What is claimed is:

1. A remote access system for a vehicle, comprising:
   at least one receiver configured to detect a location of a mobile device; and
   a controller comprising a processor configured to:
      determine an association of the mobile device to an authorized user when the mobile device is within a first range from the vehicle;
      authenticate the authorized user when the mobile device is within a second range from the vehicle, wherein the second range is smaller than the first range;
      determine a vehicle function to perform based on data associated with the mobile device or the user; and
      perform the vehicle function when the mobile device is within a third range from the vehicle and the user is authenticated, wherein the third range is smaller than the second range.

2. The remote access system of claim 1, wherein the at least one receiver includes a plurality of receivers configured to detect a location of the mobile device relative to at least one door of the vehicle.

3. The remote access system of claim 1, further including a door actuator secured to a door of the vehicle, wherein the vehicle function initiates the door actuator to selectively open the door.

4. The remote access system of claim 1, wherein the vehicle function includes at least one of rolling down a window, opening a hood, starting a motor, and actuating an HVAC system.

5. The remote access system of claim 1,
   wherein the at least one receiver is further configured to track the mobile device to acquire tracking data indicative of movement of the user, and
   wherein the processor is further configured to:
      compare the tracking data to movement trajectory data stored in a storage unit; and
      perform the vehicle function based on the tracking data matching the stored movement trajectory data.

6. The remote access system of claim 5, wherein the vehicle function includes selectively opening one of a plurality of doors and hoods of the vehicle based on the tracking data matching the movement trajectory data stored in the storage unit.

7. The remote access system of claim 1, wherein the authentication is based on certificate data stored on the mobile device or biometric data.

8. The remote access system of claim 1, wherein the controller is further configured to determine a vehicle function to perform based on a location of the user or the vehicle.

9. The remote access system of claim 1, further including a camera configured to capture a gesture of the authenticated user, wherein the processor is configured to compare the captured gesture to gesture data stored in a storage unit, wherein the vehicle function is performed based on the captured gesture matching the stored gesture data.

10. The remote access system of claim 1, wherein the controller is further configured to perform the vehicle function at a time specified by calendar data associated with the user.

11. A method of remote access for a vehicle, the method comprising:
   detecting, with at least one receiver, a location of a mobile device when the mobile device is within a first range;
   determining, with a processor, an association of the mobile device to an authorized user;
   authenticating, with the processor, the user based on the mobile device being detected within a second range from the vehicle, wherein the second range is smaller than the first range;
   determining, with the processor, a vehicle function to perform based on data associated with the mobile device or the user; and
   performing, with the processor, the vehicle function when the mobile device is detected within a third range from the vehicle and the user is authenticated, wherein the third range is smaller than the second range.

12. The method of claim 11, wherein detecting the location of the mobile device includes detecting, with a plurality of receivers, a location of the mobile device relative to at least one door of the vehicle.

13. The method of claim 11, wherein performing the vehicle function includes selectively opening a door or a hood of the vehicle.

14. The method of claim 11, further including:
   tracking, with the at least one receiver, the mobile device to acquire tracking data indicative of movement of the user, and
   comparing, with the processor, the tracking data to movement trajectory data stored in a storage unit; and
   performing, with the processor, the vehicle function based on the tracking data matching the stored movement trajectory data.

15. The method of claim 14, wherein performing the vehicle function includes selectively opening one of a plurality of doors and hoods of the vehicle based on the tracking data matching the movement trajectory data stored in the storage unit.

16. The method of claim 11, wherein authenticating the user includes:
   comparing, with the processor, certificate data stored on the mobile device with a valid response stored in a storage unit; or
   comparing, with the processor, biometric data received from the user to user data stored in a storage unit.

17. The method of claim 11, determining the vehicle function to perform is further based on a location of the user or the vehicle.

18. The method of claim 11, further including controlling, with the processor, a camera to capture a gesture of the user based on detection of the mobile device; and comparing, with the processor, the captured gesture to gesture data stored in a storage unit, wherein the vehicle function is performed based on the gesture data matching the stored gesture data.

19. The method of claim 11, wherein performing the vehicle function further includes performing the vehicle function at a time specified by calendar data associated with the user.

20. A vehicle comprising:
a frame; and
a remote access system including:
   at least one receiver positioned in or on the frame and configured to detect a location of a mobile device; and
   a controller comprising a processor configured to:
      determine an association of the mobile device to an authorized user when the mobile device is detected within a first range from the vehicle;
      authenticate the user based on the mobile device being detected within a second range from the vehicle, wherein the second range is smaller than the first range;
      determine a vehicle function to perform based on data associated with the mobile device or the user, and
      perform the vehicle function when the mobile device is detected within a third range from the vehicle and the user is authenticated, wherein the third range is smaller than the second range.

* * * * *